Oct. 25, 1960    C. H. ELLIOTT ET AL    2,957,323
ROLLING IMPULSE CLUTCH
Filed Sept. 17, 1958    2 Sheets-Sheet 1
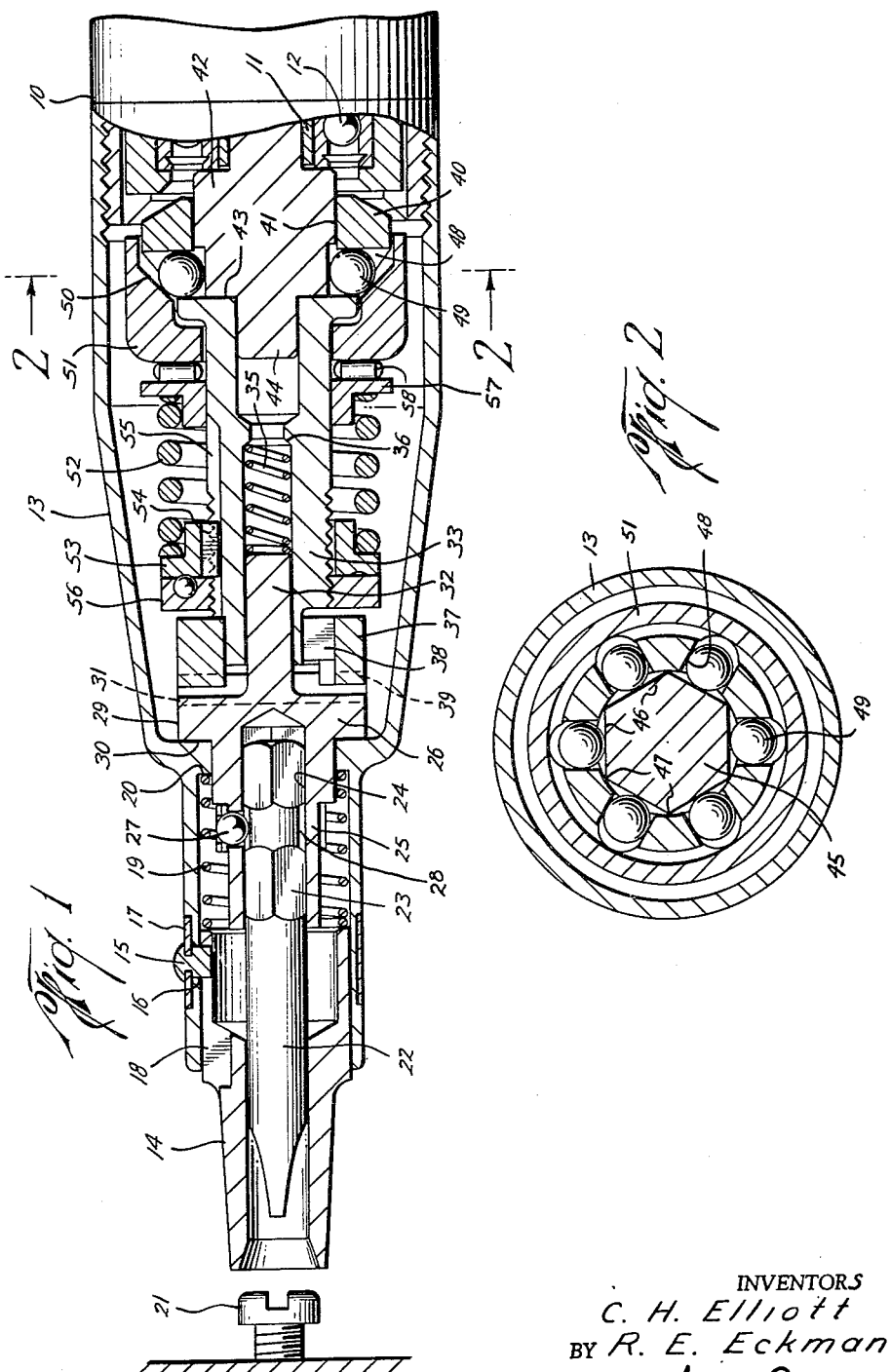
INVENTORS
C. H. Elliott
BY R. E. Eckman
ATTORNEY Oct. 25, 1960   C. H. ELLIOTT ET AL   2,957,323
ROLLING IMPULSE CLUTCH
Filed Sept. 17, 1958   2 Sheets-Sheet 2
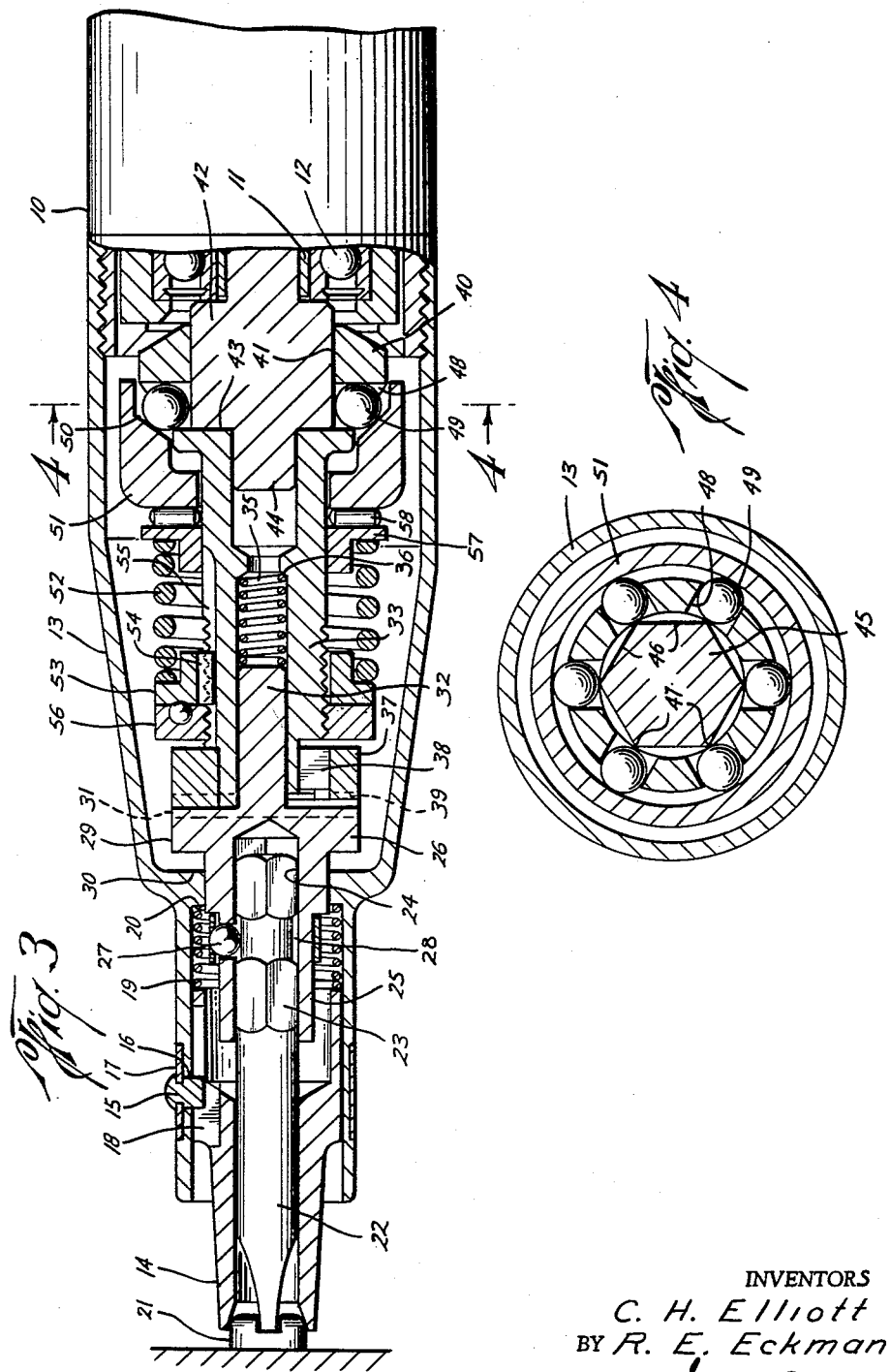
INVENTORS
C. H. Elliott
BY R. E. Eckman
ATTORNEY United States Patent Office 2,957,323
Patented Oct. 25, 1960

1

2,957,323
ROLLING IMPULSE CLUTCH
Charles H. Elliott and Richard E. Eckman, Houston, Tex., assignors to Reed Roller Bit Company, Houston, Tex., a corporation of Texas Filed Sept. 17, 1958, Ser. No. 761,575
6 Claims. (Cl. 64—29)

This invention relates broadly to improvements in clutches generally, but more particularly to clutch devices adapted for use in portable power driven tools such as used for setting screws, nuts, bolts and the like.

One object of this invention is to provide such a tool with a primary clutch adapted to engage upon axial pressure applied to the tool by the operator when the tool implement is presented to the work, this primary clutch is intended to remain in operative position as long as the tool implement is retained on the work and irrespective of the torque to which it is subjected, and with a secondary or rolling impulse clutch susceptible of automatic release when the resistance to rotation of the tool implement reaches a predetermined maximum.

Another object of this invention is to provide a releasable torque responsive clutch wherein the cooperating elements are arranged and disposed in a manner calculated to reduce wear and produce smooth and efficient operation of the clutch.

A further object of this invention is to produce a releasable torque responsive clutch mechanism incorporating simple means for adjusting, within a relatively large range, the maximum torque to be transmitted through the clutch.

Other objects and advantages more or less ancillary to the foregoing reside in the specific construction and aggroupment of the elements peculiar to this structure, as will become apparent from a more complete examination of this specification.

In the drawings:

Fig. 1 is a longitudinal sectional view of a front portion of a tool embodying the invention, with the primary clutch shown disengaged and the slip clutch engaged.

Fig. 2 is a cross sectional view taken on line 2—2 in Fig. 1.

Fig. 3 is a view similar to Fig. 1, but with the primary clutch shown engaged and the slip clutch disengaged.

Fig. 4 is a cross sectional view taken on line 4—4 in Fig. 3.

Referring to the drawings in which like symbols designate corresponding parts throughout the several views, 10 designates the front end of a fluid actuated rotary motor well known in this art, and since the motor forms no part of this invention, no further showing and description is necessary other than pointing out that such motor has a power shaft, the front end 11 of which is shown journalled within a ball bearing 12.

To the front end of the motor 10 is screwed a front housing 13 which extends axially therefrom and is adequately machined to accommodate within its front end a slidable work guide piece 14 rotationally locked to the housing by a key 15. This key extends through a radial hole 16 provided through the housing and is carried by a removable split ring 17. In order to limit the forward movement of the guide piece, the key is engageable with the inner end of its key slot 18 provided in the guide piece, which guide piece is urged forwardly by a compression spring 19 interposed between the inner end of the guide piece and shoulder 20 formed within the housing 13. The guide member has its forward end internally shaped to fit over the work, which is here represented as a screw 21, and guide the forward end of a tool implement 22 into operative engagement with the work. The rear end portion of the tool implement is provided with an hexagonal shank 23 detachably mounted within a corresponding bore 24 provided within the front shafted end portion or socket 25 of a driven clutch member 26. The shank 23 is detachably locked to the driven clutch member 26 by the usual spring detent 27 fitting within an annular recess 28 provided intermediate the ends of the shank.

The driven clutch member 26 is provided with a circular flange 29 having one side engageable with a shoulder 30 provided within the housing 13, while the other side of the flange is provided with radial clutch jaws 31. A central pivot 32 extends axially from the flange 29 into the forward end of a driving sleeve 33 where it is journalled for rotation relative thereto, and urged forwardly by a compression spring 35 interposed between the end of the pivot and a shoulder 36 formed within the sleeve 33. The forward end of the sleeve 33 is machined to receive a driving clutch member 37 which is fixed thereon for rotation therewith by any suitable means such as a locking element 38. The forward face of the driving clutch member 37 is provided with radial jaws 39 engageable with the jaws 31 for transmitting rotation to the socket 25. The other or inner end of the sleeve 33 is enlarged to form a circular head 40 provided with a smooth central bore 41 closely fitted for running fit over a clutch spindle 42, which spindle has its forward end reduced to form an annular shoulder 43 resting on the flat bottom of the bore 41 and a pilot 44 journalled within the sleeve 33. The rear end 44' of the clutch spindle 42 is also reduced to fit closely within the front end 11 of the motor shaft where it is rotationally locked thereto by any suitable means, not shown. Adjacent the shoulder 43, the clutch spindle 42 is provided with a polygonal cam 45, which in this instance is shown to be of the hexagonal type having six flat sides 46 equidistant from the center axis of the spindle and joined by six points or vertexes 47 also equidistant from the center axis of the clutch spindle. Adjacent the cam 45, the head 40 of the driving sleeve 33 is provided with six equally spaced bores 48 which extend radially through the sleeve and have their center axes located within a vertical plane in Figs. 1 and 3 passing through the sides 46 of the cam at substantially one halfway the width thereof. Each bore 48 has a detent or ball 49 closely fitted therein for free movement relative to the sleeve, which sleeve at this location constitutes a ball carrier having a wall thickness materially smaller than the diameter of the balls to enable the balls to project beyond the inside and outside walls of the sleeve.

The balls 49 are normally maintained against the sides 46 of the cam 45 by the inwardly inclined wall 50 of a ball retainer 51 mounted on the sleeve 33 for movement relative thereto. The retainer forms a cam urged against the balls 49 by the force of a compression spring 52 mounted around the sleeve with one end engaging a spring follower 53 slidably mounted on the sleeve 33 but rotationally locked thereon by a key 54 fitted within a slot 55. The spring follower 53 is axially adjustable on the sleeve by an adjustment nut 56 screwed on the sleeve. The other end of the spring 52 engages a second spring follower 57 free to slide and rotate on the sleeve and transmit the force of the spring 52 to the ball retainer or cam 51 through a needle bearing assembly 58, thereby enabling free rotation of the ball retainer irrespective of the axial forces to which it is subjected by the spring 52.

From the foregoing description, it will be understood that when the tool is at rest and during normal operating conditions, the balls 49 of the ball impulse clutch remain in operative engagement with the sides or flat surfaces 46 of the cam 45 by virtue of the axial force to which the ball retainer 51 is subjected by the spring 52, which axial force by virtue of the inwardly inclined surface 50 of the ball retainer, results in a radially inward force applied on the balls 49. During normal operating conditions, the rotation of the motor shaft 11 is transmitted to the clutch spindle 42, and therefrom to the sleeve 33 by virtue of the engagement of the balls 49 with the sides 46 of the regular polygonal cam 45. When the tool is at rest as shown in Fig. 1, the other parts of the mechanism are proportioned in a manner calculated to provide disengagement of the primary clutch, that is disengagement of the clutch jaws 31 from the jaws 39, thereby preventing rotation of the tool implement 22 even though the motor 10 is operating to rotate the power shaft 11.

As the tool is applied to the work as shown in Fig. 3 by the operator pushing the tool against the work, the guide piece 14 upon contact with the work or screw 21 slides inwardly by compressing the spring 19 and the bit 22 together while the rest of the tool moves forwardly until the bit operatively engages the work. Thereafter the continued pressure exerted by the operator on the tool causes the bit 22 and its socket 25 to move inwardly and cause operative engagement of the driven clutch jaws 31 with the driving clutch jaws 39, whereupon rotation is transmitted to the tool implement or bit 22. When the screw 21 is set, the tool implement 22 is prevented to rotate even though the primary clutch 26—37 is still engaged, thereby causing the torque to which the clutch spindle 42 is subjected to drive the vertexes 47 of the cam 45 under the balls 49 to cause outward radial movement of the balls 49 within the sleeve bores 48 and the consequential forward axial movement of the ball retainer 51 by virtue of the radial forces of the balls on the inwardly inclined surface 50 of the ball retainer. As the polygonal cam 45 continues to rotate with the flats 46 passing under the balls, the balls will again be moved inward by the inclined surface of the ball retainer 51 by virtue of the axial force to which the retainer is subjected by the spring 52. This in and out motion of the balls or rolling impulse of the secondary clutch will continue as long as the fluid motor is operated and the tool implement 22 is subjected to a predetermined resistance to rotation. As the tool is finally removed from the work, the balls 49 will automatically re-engage the sides 46 of the cam 45 by virtue of the spring biased action of the ball retainer 51, or more particularly of the inclined surface 50 on the balls 49, while the spring 35 will automatically effect the disengagement of the primary clutch 26—37.

From the foregoing description it will be understood that since the axial force of the spring 52 is transmitted to the ball retainer 51 through the medium of the needle bearing 58, the ball retainer 51 is free to rotate relative to the sleeve 33, thus as the cam 45 rotates relative to the balls, it causes the balls to roll on their own axis, which rolling motion causes the ball retainer to rotate freely without interference or slippage with respect to the balls, thereby resulting in a smooth and efficient operation of the rolling impulse clutch irrespective of the loads to which it is subjected.

It will further be understood that since the balls 49 normally engage the flat sides 46 of the polygonal cam 45, upon relative rotation between the clutch members 33 and 42 the flat sides of the cam exert radial forces on the balls, causing them to gradually move outwardly until the vertexes 47 of the cam pass under the balls. In other words, during relative rotation between the balls or detents 49 and the cam 45 in a given direction, one half of the width of the flat sides of the cam as viewed in Figs. 2 and 4 are effective to move the balls outwardly, thereby resulting in a smooth and efficient operation of the clutch release wherein the cam provides relatively long wear resisting surfaces operating on the balls to effect release of the clutch.

From the foregoing description, it will also be understood that the extent of the torque to be delivered through the ball impulse clutch can be varied by adjusting the compression of the spring 52 by the tightening or loosening of the adjustment nut 56.

Although the foregoing description is necessarily of a detailed character in order to completely set forth the invention, it is understood that the specific terminology is not intended to be restrictive or confining and it is to be further understood that various rearrangements of parts and modifications of structural detail may be resorted to without departing from the scope or spirit of the invention as herein claimed.

We claim:
1. In a device of the character described, a pair of coaxially disposed members one surrounding the other, rotation transmitting means between said members including a regular polygon cam on one of said members, a plurality of balls on the other member of a number equal to the number of sides on said cam and radially movable relative to said cam, a ball retainer axially and rotatably movable on one of said members having an inclined wall engaging said balls, spring means acting on said retainer to cause a wedging action of said inclined walls on said balls to maintain the balls in engagement with the sides of said cam and normally prevent relative rotation between said members, antifriction means between said spring means and retainer enabling free rotation of the retainer, said cam upon a predetermined resistance to rotation of one of said members adapted to drive said balls in a direction opposite to said wedging action to effect axial movement of said retainer against said spring means and enable relative rotation between said members, the driving force of said cam on said balls imparting a rolling motion to the balls and rotation to said retainer.

2. In a device of the character described, a spindle surrounded by a coaxial sleeve, rotation transmitting means between said spindle and sleeve including a regular polygon cam on said spindle, a ball for each side of said cam radially movable on said sleeve and protruding beyond the inner and outer walls thereof, a ball retainer surrounding said sleeve axially and rotatably movable thereon and having an inclined wall engaging said balls, a spring acting on said retainer causing said inclined wall to drive said balls in engagement with the sides of said cam and normally prevent relative rotation between said spindle and sleeve, antifriction means between said spring and retainer enabling free rotation of the retainer, said cam upon a predetermined resistance to rotation of said sleeve adapted to drive said balls in a direction away from the sides of said cam to effect axial movement of said retainer against said spring and enable relative rotation between said spindle and sleeve, the driving force of said cam on said balls imparting a rolling motion to the balls and rotation to said retainer.

3. In a device of the character described, a pair of coaxially disposed members one surrounding the other, rotation transmitting means between said members including a polygonal cam on one of said members and a ball on the other member radially movable relative to said cam, spring biased means exerting a force on said ball in one direction to maintain it in engagement with one side of said cam and prevent relative rotation between said members, said cam upon a predetermined resistance to rotation of one of said members adapted to drive said ball in a direction opposite to that of said force while causing said ball to roll on its own axis, thereby effecting rotating deflection of said spring biased means and enabling relative rotation between said members, and antifriction means coaxial with said spring biased means enabling free rotation of the latter.

4. In a device of the character described, a pair of coaxially disposed members one surrounding the other, rotation transmitting means between said members including a polygonal cam on one of said members and a ball on the other member radially movable relative to said cam, spring biased means exerting a force on said ball in one direction to maintain it in engagement with one side of said cam and prevent relative rotation between said members, antifriction means coaxial with said spring biased means enabling free rotation of the latter, said cam upon a predetermined resistance to rotation of one of said members adapted to drive said ball in a direction opposite to that of said force while causing said ball to rotate on its own axis, thereby effecting rotation and deflection of said spring biased means and enabling relative rotation between said members.

5. In a device of the character described, a spindle surrounded by a coaxial sleeve, rotation transmitting means between said spindle and sleeve including a regular polygon cam on said spindle, a ball on each side of said cam radially movable on said sleeve and protruding beyond the inner and outer walls thereof, a spring biased element surrounding said sleeve, an antifriction bearing coaxial with said element enabling free rotation thereof, said element exerting a radial force on said balls in one direction to maintain them in engagement with the sides of said cam and normally prevent relative rotation between said spindle and sleeve, said cam upon a predetermined resistance to rotation of said sleeve adapted to drive said balls in a direction opposite to that of said force while imparting rotation to the balls on their own axis, thereby effecting rotation and deflection of said spring biased element and enabling relative rotation between said spindle and sleeve.

6. In a device of the character described, a pair of coaxially disposed members one surrounding the other, rotation transmitting means between the said members including a regular polygon cam on one of said members, a plurality of balls on the other member of a number equal to the number of sides on said cam and radially movable relative to said cam, a single spring-biased cam element exerting a radial force on the said balls in one direction to maintain them in engagement with the sides of the said cam and normally prevent relative rotation between said members, said polygon cam upon a predetermined resistance to rotation of one of said members adapted to drive said balls in a direction opposite to that of said force to effect deflection of the said cam element and enable relative rotation between the said members whereby the driving force of said polygon cam on said balls imparts a rolling motion to the balls, and antifriction means coaxial with said cam element enabling its free rotation imparted thereto by said balls.

References Cited in the file of this patent

UNITED STATES PATENTS

| | | |
|---|---|---|
| 1,865,356 | Daum | June 28, 1932 |
| 2,263,709 | Van Sittert | Nov. 25, 1941 |
| 2,344,673 | Brown | Mar. 21, 1944 |
| 2,514,227 | Dodge | July 4, 1950 |
| 2,546,633 | Dodge | Mar. 27, 1951 |
| 2,882,704 | Quackenbush | Apr. 21, 1959 |